(12) United States Patent
Lin et al.

(10) Patent No.: US 8,036,072 B2
(45) Date of Patent: Oct. 11, 2011

(54) HOLOGRAPHIC RECORDING AND REPRODUCTION SYSTEM HAVING SERVO OPTICAL PATH

(75) Inventors: Chih-Ming Lin, Hsinchu (TW); Yung-Sung Lan, Hsinchu (TW); Tzuan-Ren Jeng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 741 days.

(21) Appl. No.: 11/808,195

(22) Filed: Jun. 7, 2007

(65) Prior Publication Data
US 2008/0192589 A1   Aug. 14, 2008

(30) Foreign Application Priority Data
Feb. 14, 2007 (TW) .............................. 96105518 A (51) Int. Cl.
*G11B 7/00* (2006.01)
(52) U.S. Cl. ............... 369/44.23; 369/103; 369/111; 369/112.01; 369/109.01
(58) Field of Classification Search ............... 369/44.23, 369/109, 103, 111, 112
See application file for complete search history.

(56) References Cited

U.S. PATENT DOCUMENTS

| | | | | |
|---|---|---|---|---|
| 5,953,297 | A * | 9/1999 | Maeda et al. | 369/47.47 |
| 6,181,658 | B1 * | 1/2001 | Van Den Enden et al. | 369/59.25 |
| 6,700,686 | B2 | 3/2004 | King et al. | |
| 6,721,076 | B2 | 4/2004 | King et al. | |
| 6,909,529 | B2 | 6/2005 | Curtis | |
| 7,576,900 | B2 * | 8/2009 | Lan et al. | 359/22 |
| 2004/0212859 | A1 | 10/2004 | Tsukagoshi | |
| 2004/0264356 | A1 | 12/2004 | Chen et al. | |
| 2005/0002311 | A1 * | 1/2005 | Ichihara et al. | 369/103 |
| 2005/0007930 | A1 * | 1/2005 | Horimai et al. | 369/103 |
| 2005/0018260 | A1 * | 1/2005 | Hirao et al. | 359/3 |
| 2005/0036436 | A1 * | 2/2005 | Horimai et al. | 369/118 |
| 2005/0179969 | A1 * | 8/2005 | Ogasawara | 359/30 |
| 2005/0200928 | A1 | 9/2005 | Mori et al. | |
| 2007/0140091 | A1 * | 6/2007 | Lin et al. | 369/103 |
| 2007/0153347 | A1 * | 7/2007 | Lan et al. | 359/35 |
| 2007/0206448 | A1 * | 9/2007 | Tsukagoshi et al. | 369/3 |
| 2007/0242578 | A1 * | 10/2007 | Tasaka et al. | 369/47.49 |
| 2008/0273444 | A1 * | 11/2008 | Ogasawara et al. | 369/103 |

FOREIGN PATENT DOCUMENTS

| | | |
|---|---|---|
| TW | I246682 B | 1/2006 |
| TW | I265496 B | 11/2006 |

* cited by examiner

*Primary Examiner* — Mohammad Ghayour
*Assistant Examiner* — Aneeta Yodichkas
(74) *Attorney, Agent, or Firm* — Birch, Stewart, Kolasch and Birch, LLP (57) ABSTRACT

A holographic recording and reproduction system includes a servo optical path, which is used to provide a servo mechanism, so that holographic interference fringes can be stored continuously into a holographic recording medium, and when the reproduction signals are desired, they can be fetched and obtained swiftly and accurately by making use of the servo mechanism. In addition, the servo light spot of the servo optical path is located on the optical axis of an object lens, thus reducing the image aberrations produced and raising the quality of the signals read for the servo track searching. Moreover, the light intensity distribution of the reference beams reflected by the holographic recording medium is monitored and controlled, as such realizing the analysis and adjustment of the relative distance and inclination angle between the holographic recording and reproduction system and the holographic recording medium.

16 Claims, 11 Drawing Sheets

HOLOGRAPHIC RECORDING AND REPRODUCTION SYSTEM HAVING SERVO OPTICAL PATH

CROSS-REFERENCE TO RELATED APPLICATIONS

This non-provisional application claims priority under 35 U.S.C. §119(a) on Patent Application No(s). 096105518 filed in Taiwan, R.O.C. on Feb. 14, 2007, the entire contents of which are hereby incorporated by reference.

BACKGROUND

1. Field of Invention

The invention relates to a holographic recording and reproduction system, in particular to a holographic recording and reproduction system having servo optical path.

2. Related Art

Presently, in the market of optical storage medium, since the capacity of the commercialized blu-ray disc can hardly exceed the threshold of 100 GBytes, thus various kinds of potential ultra-high capacity data recording technologies are under intensive research and development, and among them, the holographic disc is the most promising choice. The research and development of holographic recording technology has had a long history, however, due to various reasons, it still has not been utilized in the consumer optical storage products. Taking it for an example, the holographic experiments conducted in the early days must be carried out by utilizing an enormously voluminous high power laser light source of several hundredths of milliwatts as well as a complicated optical system, and moreover, they must be used in cooperation with a heavy shockproof table. Furthermore, the Photo-Refractive Crystal utilized as the holographic recording medium is even more expensive than that of the ordinary medium. However, along with the rapid progress and development of this technology, the restrictions originally imposed on the holographic storage and recording technology have already solved and removed one-by-one. For example, the following systems and devices have made tremendous progress in their technologies, such as miniaturized high power laser, high photo-sensitive recording materials, and miniaturized data access optical system having position servo functions, such that the conventional thinking that the recording medium must be capable of being rewriteable is changed due to the consumer's behavior in the CD-R market. However, up to the present day, it is still a very difficult task for the recording medium of Photo-Refractive Crystal capable of being rewriteable and also able to satisfy the requirement of excellent material characteristics, high data stability and cheap prices. In recent years, due to the popularity and widespread utilization of ordinary-priced write-once optical disk CD-R/DVD-R, thus the recognition that the holographic recording does not have to strive for the medium material capable of being rewriteable has gained widespread acceptance. If the functional requirement of rewriteable is not taken into consideration, then there are plenty of cheap organic materials having high photo sensitivity, which can be chosen and utilized as data recording layer for the holographic CD, for example, a photo polymer is one of them. Under strong irradiation of recording light, the photopolymer may produce molecular chain like chemical reactions, thus the change of optical properties caused by the characteristics of sparsity and density of the molecular chains can be used to record and regenerate data related to 3-dimensional holographic interference fringes.

The concept of the afore-mentioned miniaturized data access optical system having position servo functions is originated from the servo mechanism of CD/DVD player, and that is the key point in realization the implementation of holographic discs.

With regard to the technology of holographic storage, as disclosed in U.S. Patent Gazette publication No 20040212859 and also U.S. Pat. No. 6,700,686, wherein, a transmissive holographic recording medium is utilized. Due to the transmissive type design, an image sensor is placed on the other side of the holographic recording medium, thus making the volume of the overall system enormously large. Moreover, in this transmissive type system framework design, usually, the optical axis of object lens to be passed by the signal beam is designed perpendicular to the holographic recording medium, while a reference beam is incident obliquely upon the holographic recording medium. As such, it may produce deviations related to the relative positions and directions of the reference beam and the holographic recording medium. Once the deviation occurs, and when the reference beam can not be incident upon the holographic recording medium along the original path, then no reproduced signal beams will be produced, thus there is no way of catching the reproduced signal beams through adjusting the signal optical path. Therefore, the image sensor used to receive the reproduced light signal will not receive any signals of the reproduced light, thus it can not restore the correct reproduced data by making use of the image processing technology. Though for the stationary holographic recording medium, the signal of the reproduced light may still be obtained, if the framework may enable the reference beam to make small scale scanning of its direction and position, thus being able to obtain the reproduced light signals. However, for a holographic recording medium in continuous motion, it is rather difficult to obtain the reproduced light signals.

In addition, another related prior art is disclosed in U.S. Pat. No. 6,721,076 and U.S. Pat. No. 6,909,529, wherein, an optical framework used for reflective type holographic recording medium is disclosed in detail.

SUMMARY OF THE INVENTION

In view of the above-mentioned problems and drawbacks of the prior art, the invention discloses a holographic recording and reproduction system having servo optical path and a method for implementing the same, thus developing and providing a corresponding optical framework in facilitating a speedy and convenient data access and storage.

Therefore, to achieve the above-mentioned objects, the invention provides a holographic recording and reproduction system having servo optical path, including: a holographic recording medium, a light source, a Spatial Light Modulator (SLM), a servo light source, and a servo beam guidance portion. Wherein, the light source is used to generate a signal beam and a reference beam, and the reference beam is used to be incident upon a holographic recording medium along a first direction; the SLM is located on the optical path of the signal beam, thus the signal beam is incident upon the holographic recording medium along a second direction, after it enters and exits the SLM, hereby interfering with the reference beam in producing a holographic interference fringe in the holographic recording medium, wherein, when the reference beam is incident again upon the holographic interference fringe along the first direction, a reproduction beam is produced, and it is incident upon an image sensor along the direction opposite to that of the optical path of the signal beam; a servo light source, that is used to generate a servo beam; and a servo beam guidance portion, wherein the servo light is incident upon a servo track of a holographic recording medium along the first direction by the servo beam guidance portion, and reflects a servo beam from the servo track, thus enabling the holograms to be recorded along the servo track and be recorded in the holographic recording medium, thus the beam formed by the servo beam includes that formed by the reference beam.

In addition, the invention also discloses a servo optical path, and that is used in a holographic recording and reproduction system. Wherein, the holographic recording and reproduction system includes a light source, which can be divided into a reference beam and a signal beam, and each of which is incident upon a holographic recording medium respectively along a first direction and a second direction, thus generating a holographic interference fringe. In the above description, the servo optical path includes a servo light source and a servo beam guidance portion. Wherein, the servo light source is used to generate a servo beam; and the servo beam guidance portion guides the servo beam and reference beam to be incident upon a holographic recording medium along the same direction; the servo beam includes a reference beam. In addition, both the servo beam and the reference beam converge on a holographic recording medium by passing through an object lens. Wherein, the converged reference beam is incident upon a reflection layer of the holographic recording medium, while the converged servo beam is incident upon a reflection layer of the holographic recording medium and a servo track. As such, the servo beam is modulated by the servo track, and the servo beam is reflected by the servo track.

In conclusion, the invention proposes a holographic recording and reproduction system having servo optical path, and that is utilized to enable the reference beam to keep incident upon the holographic recording medium along the first direction in cooperation with a servo mechanism, so that the holograms are recorded continuously along the servo track, and is recorded continuously in a holographic recording medium. For this purpose, a plurality of optical frameworks is proposed. In addition, several holographic multiplexing mechanisms can be utilized in each of these frameworks, hereby further raising the capacity of the holographic recording medium.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus is not limitative of the invention, and wherein.

DETAILED DESCRIPTION OF THE INVENTION

The purpose, construction, features, and functions of the invention can be appreciated and understood more thoroughly through the following detailed description with reference to the attached drawings.

In the following, the preferred embodiments of the invention will be described in detail together with the attached drawings.

Firstly, refer to FIGS. 1A to 1D for a schematic diagram of a holographic recording and reproduction system having servo optical path according to a first embodiment of the invention. As shown in FIGS. 1A to 1D, a light source 100 is used to emit coherence light, which is split into a reference beam 101 and a signal beam 103 upon passing through a first light guidance portion 200, and that is used to guide the reference beam 101 to be incident upon a holographic recording medium 900 along a first direction. In the embodiment, the first direction is a direction perpendicular to the holographic recording medium 900; while the signal beam 103 is incident onto a spatial light modulator (SLM) 500 after splitting by the first light guidance portion 200, so that upon subjecting to the modulation of the SLM 500, the signal beam 103 is then guided by a second light guidance portion 300 and is incident upon the holographic recording medium 900 along a second direction. Furthermore, since the polarization state of the signal beam 103 is the same as that of the reference beam 101, so that the reference beam 101 and the signal beam 103 interfere with each other in a recording layer 920 of the holographic recording medium 900, thus producing a holographic interference fringe 800, and it is recorded in the recording layer 920 of the holographic recording medium 900.

Moreover, when the reference beam 101 is incident again onto the holographic interference fringe 800 along the first direction, a reproduction beam 105 will be produced, and this reproduction beam 105 will be incident onto an image sensor 350 along the same optical path of the signal beam 103 yet in reverse direction, and it is interpreted by the image sensor.

Furthermore, the holographic storage media 900 includes a first substrate 910, a second substrate 930, and a recording layer 920. The recording layer 920 is formed between the first substrate 910 and the second substrate 930, and is used to record light signal, such as a holographic interference fringe 800 and the like. The second substrate 930 is composed of a reflection layer 936, a protection layer 932, and a servo track 934. Wherein, the bottom of the second substrate is the protection layer 932, and is used to protect the bottom of the holographic recording medium from being damaged. The servo track 934 is formed on the second substrate 930, so that upon being incident onto the servo track 934, the light beam will be modulated by the servo track 934, and the shape of the servo track will be described more clearly later. The reflection layer 936 is covered on the surface of the servo track 934, so as to reflect the incident signal beam 103 and the reference beam 101.

In addition, a servo light source 400 is provided and is used to generate a servo beam 410, which is incident onto the servo track 934 of the holographic recording medium 900 through a servo beam guidance portion 420 along a first direction. Thus, the servo beam 410 is modulated and reflected by the servo track 934, and is received by a sensor portion 600, so that the reference beam 101 may be incident onto the holographic recording medium 900 along the first direction, hereby recording sequentially the holographic interference fringe 800 in the recording layer 920 of the holographic recording medium 900 along the servo track 934.

Wherein, the first light guidance portion 200 splits the light beam coming from the light source 100 into the signal beam 103 and the reference beam 101, and guides the reference beam 101 to be incident onto the holographic recording medium 900 along the first direction. As such, firstly, a first polarizing plate 210 is placed in front of the light source 100, so as to gather the light of the light source 100 and obtain a polarized light having a specific polarization, namely, a linearly polarized light. In case that the polarization direction of the linearly polarized light is parallel to the surface of the page, then it is referred to as in a P polarization state, and in case that the polarization direction of the linearly polarized light is perpendicular to the surface of the page, then it is referred to as in an S polarization state. Thus, upon passing through the first polarizing plate 210, the light beam coming from the light source 100 is converted into a linearly polarized light in P polarization state, and that is split by a light splitter 220 into the signal beam 103 and the reference beam 101, and both are in a P polarization state.

A second light guidance portion 300 is provided, and is used to guide the signal beam 103 modulated through the SLM 500 to be incident onto the holographic recording medium 900 along the second direction. Through the application of a lens and a set of reflection mirrors 310, the direction of transmission of the signal beam 103 is changed after passing through the lens and the set of reflection mirrors 310, and thus it is transmitted and incident onto the holographic recording medium 900 along the second direction. A pin hole 320 is placed between the lens and the set of reflection mirrors 310, and that is used to filter out the miscellaneous light beams other than the signal beam 103 and the reproduction beam 105. As such, the reference beam 101 and the signal beam 103 are guided through the first light guidance portion 200 and the second light guidance portion 300 to be incident onto the recording layer 920 of the holographic recording medium 900 respectively along the first and second directions. Since the polarization states of the reference beam 101 and the signal beam 103 to be incident onto the holographic recording medium 900 are identical, thus the reference beam 101 and the signal beam 103 will interfere with each other to produce a holographic interference fringe 800 and store it onto the recording layer 920.

Moreover, an object lens 230 is provided in the first light guidance portion 200, and that is used to converge and focus the reference beams 101 onto the reflection layer 936 of the holographic recording medium 900, so that the reference beam 101 may be reflected from the reflection layer 936 along the original route.

In implementing the reproduction system of the holographic recording and reproduction system, the direction of the transmission route of the reference beam 101 is opposite to that of the reference beam 101 while performing the data recording, so that in the reproduction process, when the reference beam 101 passing through the holographic interference fringe 800 of the recording layer 920, a conjugate reproduction beam 105 is produced, which is transmitted in the same route as that of the original signal beam 103 yet in an opposite direction. Therefore, in order to obtain the conjugate reproduction beam 105, a first phase delay sheet 250 is added to the first light guidance portion 200, and a second phase delay sheet 330 is added to the second light guidance portion 300. The first phase delay sheet 250 is placed at one side of the beam splitter 220, so that when a part of the reference beam 101 is incident upon the first phase delay sheet 250, its polarization state is changed to S polarization state and is referred to as the right reference beam 101; while the other part of the reference beam 101 which has not passed the first phase delay sheet 250 still maintains its P polarization state, and is referred to as the left reference beam 101. The second phase delay sheet 330 of the second light guidance portion 300 is disposed in the optical path of the signal beam 103, so that the signal beam 103 will be first incident upon and exits the SLM 500, and then be incident upon the second phase delay sheet 330, such as a half wave plate (½λ wave plate), thus its polarization is changed from a P polarization state to an S polarization state.

Figure 1A:
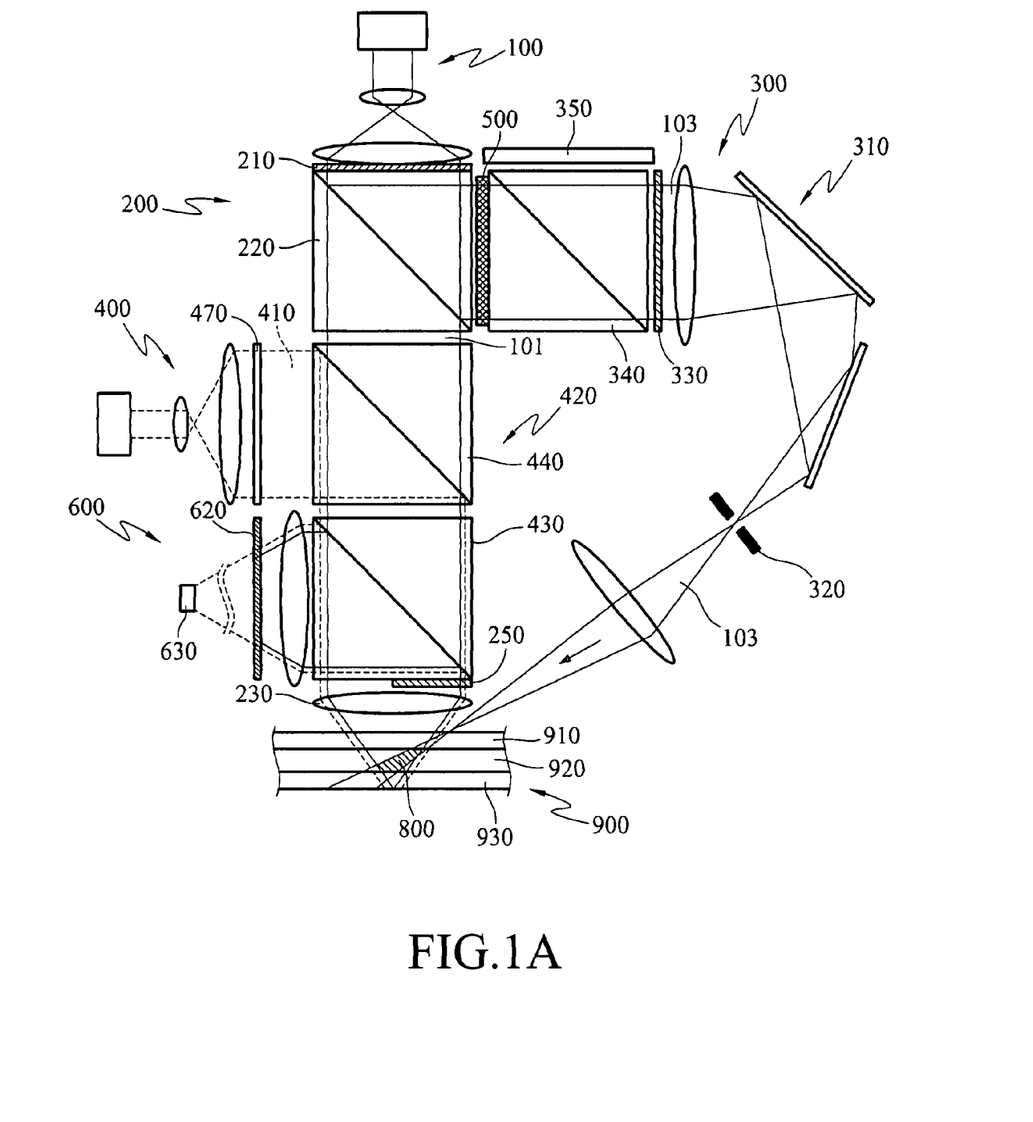
FIGS. 1A to 1D are schematic diagrams of a holographic recording and reproduction system having servo optical path according to a first embodiment of the invention.
Figure 1B:
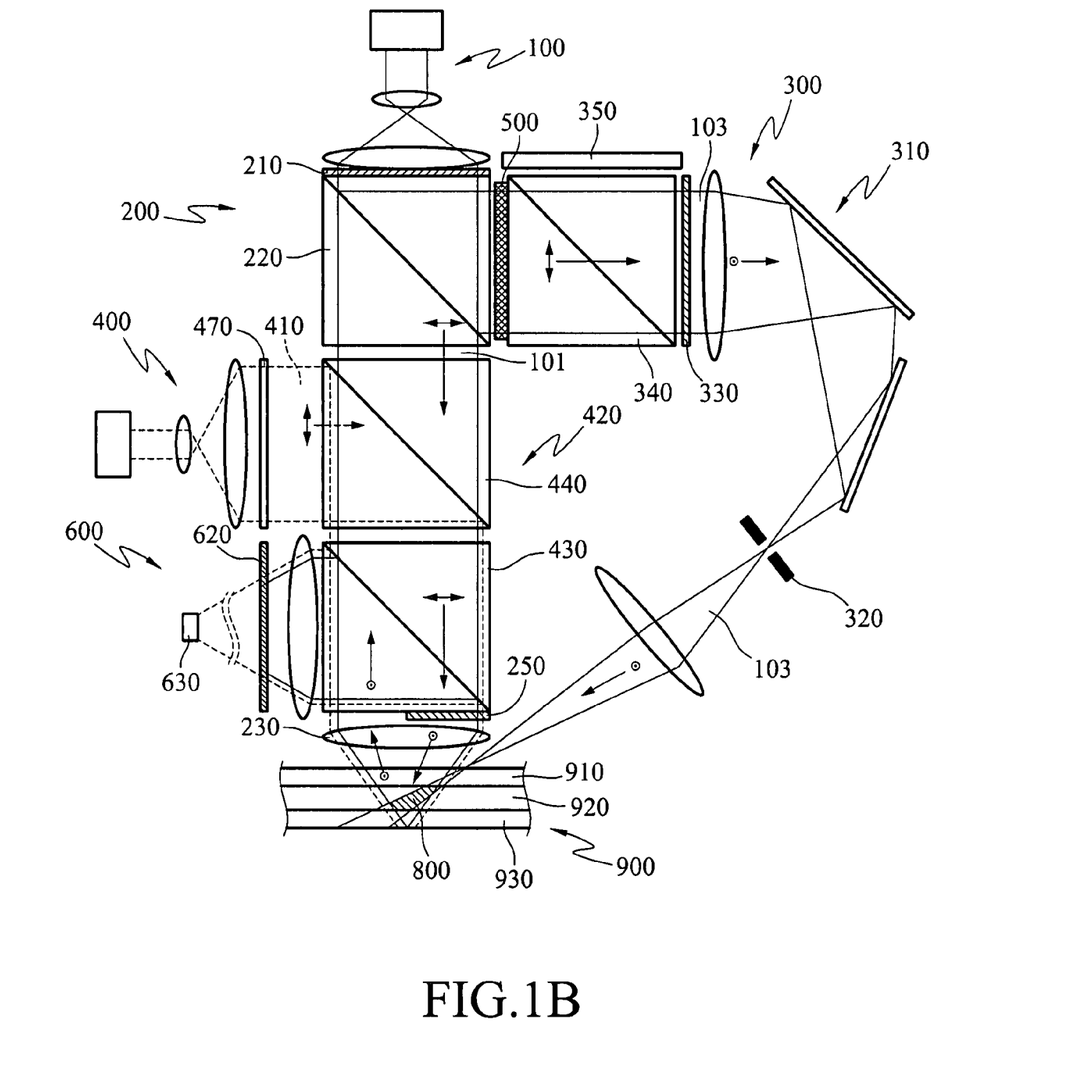

The right reference beam 101 obtained by passing through the first phase delay sheet 250 having S polarization state as its polarization state, and upon to be incident onto the reflection layer 936 of the holographic recording medium 900, it will be reflected to the opposite direction and exit the holographic recording medium 900; while the signal beam 103 is incident upon the holographic recording medium 900 along the second direction. When the signal beam 103 having S polarization and the right reference beam 101 having S polarization intercept each other, an interference phenomenon would occur to produce a holographic interference fringe 800, and it is stored in a recording layer 920 of the holographic recording medium 900, as shown in FIG. 1B.

Figure 1C:
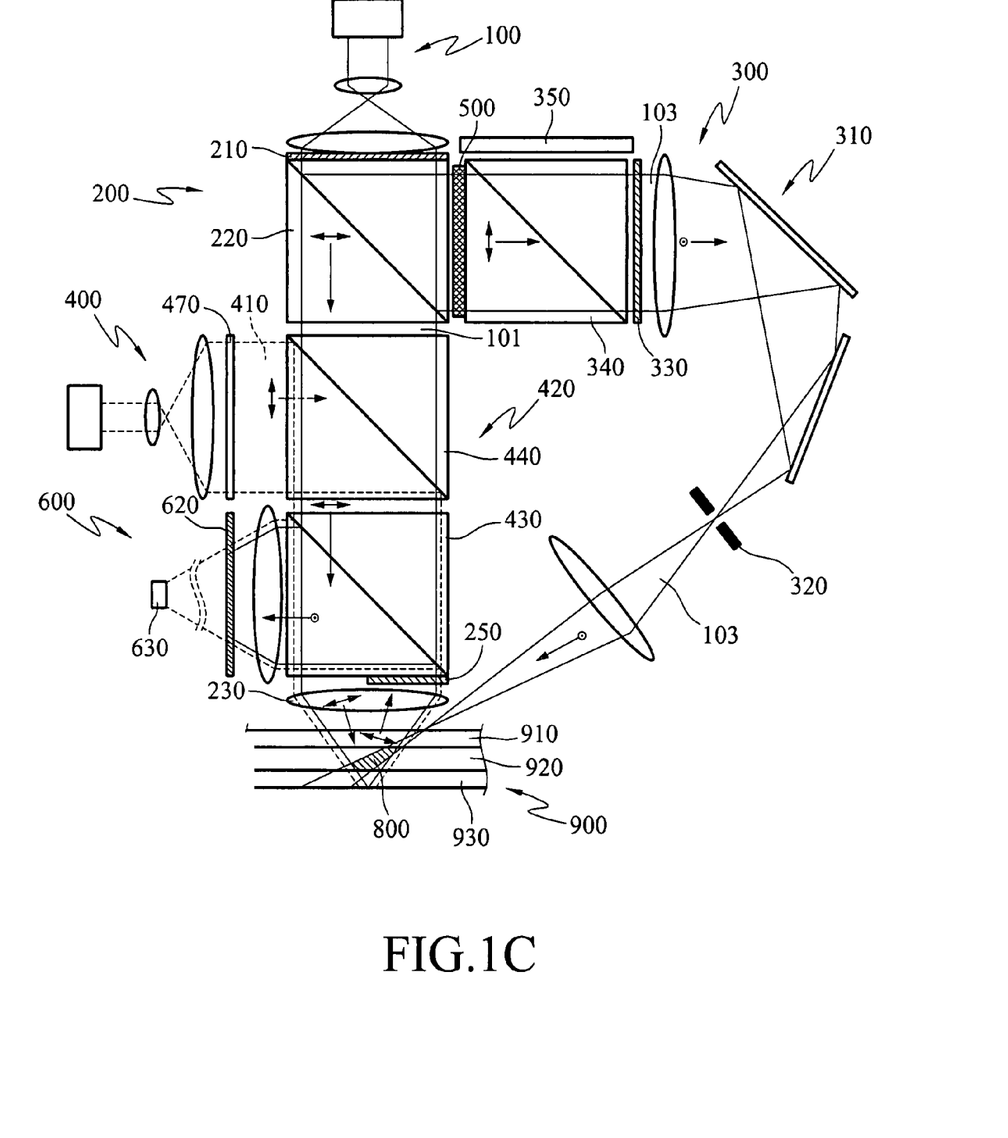

The left reference beam 101 not passing through the first phase delay sheet 250 still keeps its P polarization state as its polarization state, and when it is similarly incident upon the reflection layer 936 of the holographic recording medium 900, it will be reflected and exits the holographic recording medium 900 in an opposite direction, meanwhile, the signal beam 103 is still incident upon the holographic recording medium 900 along the second direction. As such, the signal beam 103 and the left reference beam 101 intercept each other. However, since the left reference beam 101 is in the P polarization state and the signal beam 103 is in the S polarization state, the respective two polarizations are perpendicular to each other, thus the interference phenomenon would not occur, as shown in FIG. 1C.

Figure 1D:
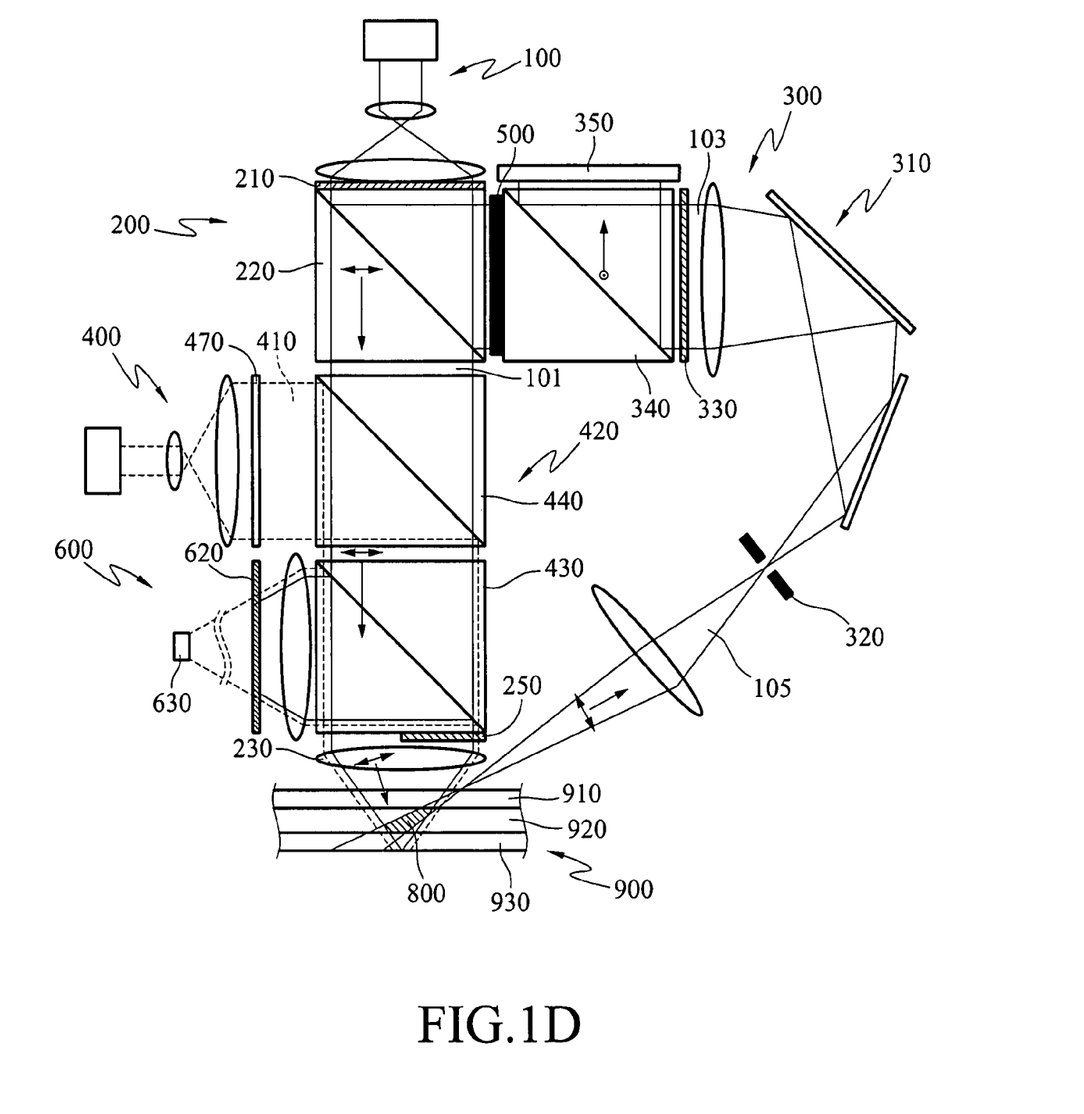

Therefore, when it is desired to generate light beam in the holographic recording and reproduction system, and in case that the left reference beam 101 not having passed the first phase delay sheet 250 is incident upon the holographic recording medium 900, it will pass through the holographic interference fringe 800 and the reflection layer 936, and it will then be reflected by the reflection layer 936 to the opposite direction and again pass through the holographic interference fringe 800 and exits the holographic recording medium 900. Since the transmission route of the left reference beam 101 is opposite to that of the right reference beam 101 while recording signal, thus a conjugate reproduction beam 105 is produced, and it will return along the original route of the signal beam 103. Due to the fact that the conjugate reproduction beam 105 is produced when the left reference beam 101 is incident upon the holographic interference fringe 800, the conjugate reproduction beam 105 is also in a P polarization state. In addition, when the conjugate reproduction beam 105 returns along the original route of the signal beam 103, it will pass through the second phase delay sheet 330, thus its polarization is changed to the S polarization, and when it is incident upon a first polarized beam splitter 340, it will be reflected by the first polarized beam splitter 340 because of the S polarization state of the conjugate reproduction beam 105. A two dimensional image sensor 350 is placed on one side of the first polarized beam splitter 340 and in the reflection direction of the conjugate reproduction beam 105, and it is used to receive and interpret the conjugate reproduction beam 105, as shown in FIG. 1D.

Moreover, in the first embodiment of the invention, the holographic recording and reproduction system further includes a servo optical path, that is used to enable the holographic recording and reproduction system to achieve the speedy track search servo function. Wherein, the optical path includes a servo light source 400 and a servo beam guidance portion 420. The servo light source 400 is used to generate a servo beam 410, and the wavelength of the servo beam 410 is different from that of the signal beam 103 and the reference beam 101.

The servo beam guidance portion 420 includes a first Dichroic Prism 440, a second polarizing plate 470, and a second polarized beam splitter 430. Wherein, the second polarized beam splitter 430 is disposed between the beam splitter 220 and the first phase delay sheet 250. The first Dichroic Prism 440 is used to separate light beams of different wavelengths. Therefore, the reference beam 101 may transmit through the first Dichroic Prism 440 unaffected. However, when the servo beam 410 is incident upon this first Dichroic Prism 440, it can not transmit through and is totally reflected. Thus, the first Dichroic Prism 440 is placed between the beam splitter 220 and the second polarized beam splitter 430, and the servo light source 400 is disposed on one side of the first Dichroic Prism 440. When the servo beam 410 generated by the servo light source 400 is first incident upon the second polarizing plate 470, so that the servo beam 410 is made into a servo beam having a specific polarization state, such as P polarization state, and thus when it is incident again onto the first Dichroic Prism 440, it will be reflected and change its direction and is incident onto a servo track 934 of the holographic recording medium 900. Yet before the servo beam 410 is incident upon the holographic recording medium 900, it must first pass through the second polarized beam splitter 430, so that only the servo beam 410 having P polarization state can get through, and a part of the servo beam 410 having P polarization will pass through the first phase delay sheet 250 and changes its polarization to S polarization, and is referred to as the right servo beam 410; while the other part of the servo beam 410 not passing through the first phase delay sheet 250 will maintain its P polarization, and is referred to as the left servo beam 410. When the right servo beam 410 is incident upon and is reflected by the servo track 934 of the holographic recording medium 900, it will exit the holographic recording medium 900 and then it is incident upon a second polarized beam splitter 430, thus the right servo beam 410 becomes a right servo beam of S polarization, and it will be reflected by the second polarized beam splitter 430 and change its direction and is incident upon a servo beam sensor 630 of a sensor portion 600. On the other hand, the left servo beam 410 not passing through the phase delay sheet 250 will be incident upon the servo track 934 of the holographic recording medium 900, and it will likewise be reflected by the servo track 934 and exits the holographic recording medium 900, and upon passing through the first phase delay sheet 250, the left servo beam 410 will change its polarization to S polarization. Thus, when the left servo beam 410 is incident upon the second polarized beam splitter 430, it will be reflected by the second polarized beam splitter 430, change its direction, and be incident upon a servo beam sensor 630 of a sensor portion 600. As such, both the left servo beam and the right servo beam 410 will be reflected by the second polarized beam splitter 430 and incident upon the servo beam sensor 630 of the sensor portion 600, and that is utilized to detect and examine the servo beam 410 modulated by the servo track 934, and then the servo beam 410 is converted into an electric signal for transmitting to a control device (not shown). This control device is used to move an optical framework or a holographic recording medium 900, so that the holographic interference fringe 800 can be read from and/or recorded into a recording layer 920 of the holographic recording medium 900 sequentially along a servo track 960, as shown in FIGS. 1A and 1B.

Moreover, in the first embodiment of the invention, the left reference beam 101 not passing through the first phase delay sheet 250 is reflected by the reflection layer 936 of the holographic recording medium 900 and the left reference beam 101 is incident upon the first phase delay sheet 250 with its polarization being changed into S polarization. Thus, when the left reference beam 101 is incident again upon the second polarized beam splitter 430, it will be reflected, change its direction, and incident upon the sensor portion 600. In order that the reference beam 101 will not be incident upon the servo beam sensor 630 together with the servo beam 410 thus affecting the reading and analysis of the servo beam 410, a wavelength filter 620 is provided in the sensor portion 600, so that the beams having the wavelength of servo beam 410 are allowed to pass through, and the beams having the wavelength of the reference beam 101 are filtered out and can not pass through.

Figure 2A:
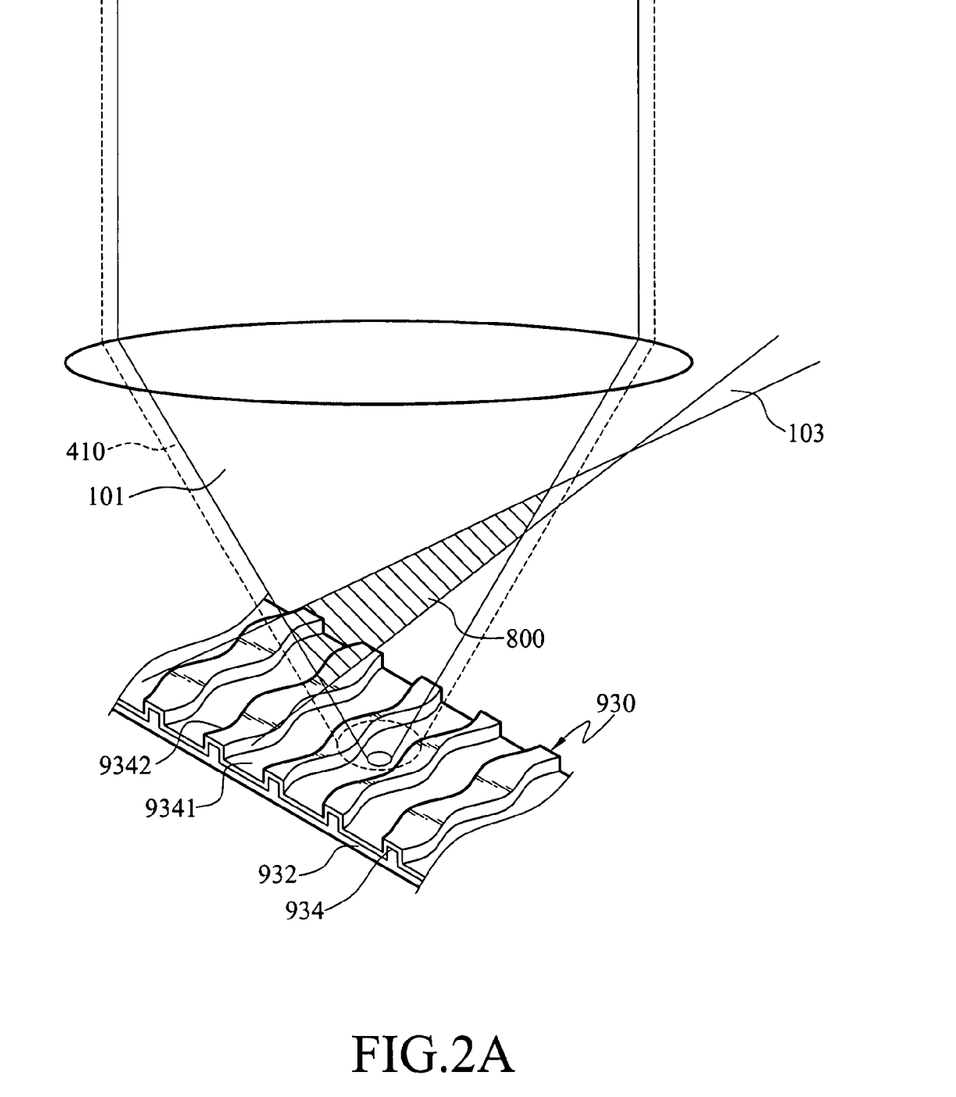
FIG. 2A is a perspective view of the track searching servo optical path of the invention.
Figure 2B:
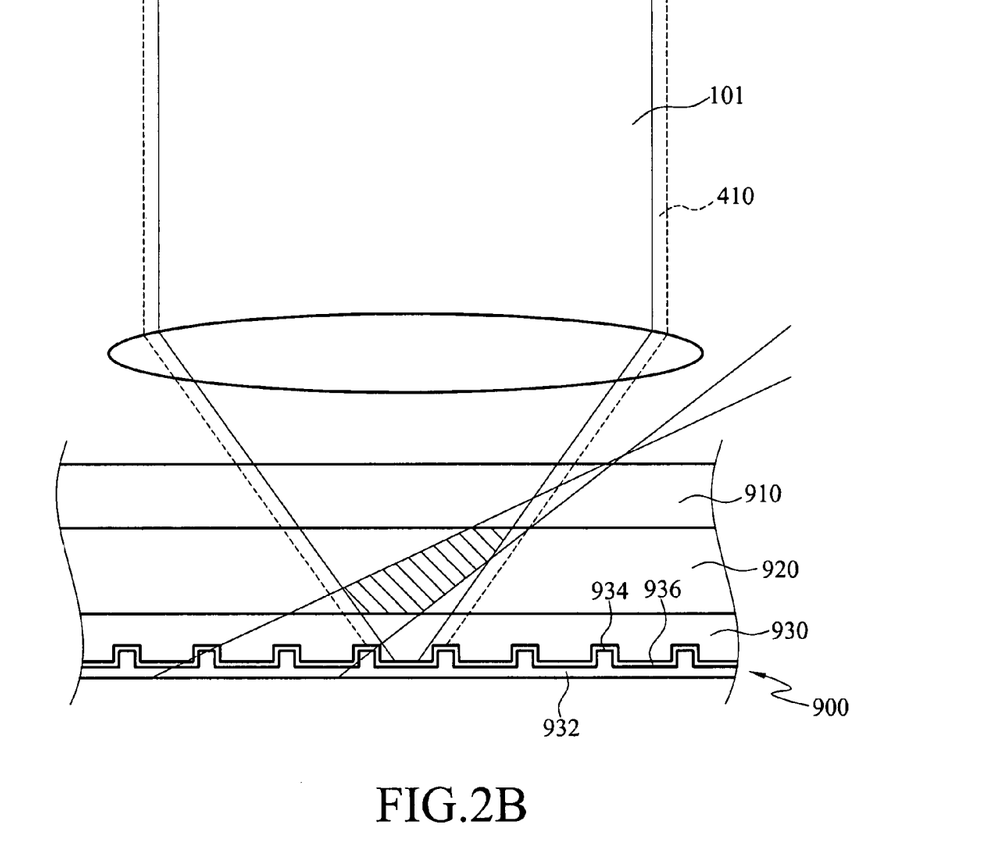
FIG. 2B is a side view of the track searching servo optical path of the invention.
Figure 2C:
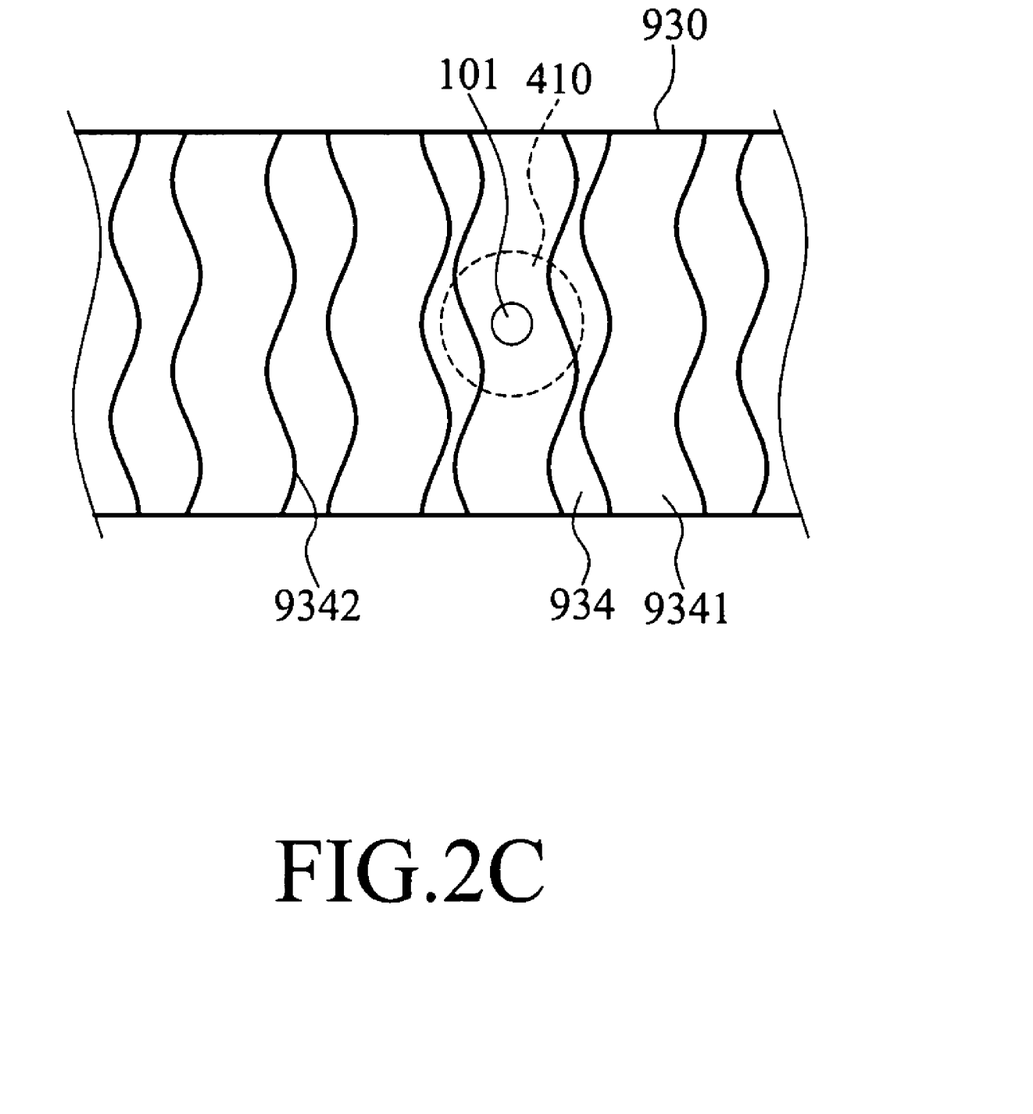
FIG. 2C is a top view of the track searching servo optical path of the invention.

In addition, refer to FIGS. 2A to 2C, which show respectively the perspective view, the side view, and the top view of the track searching servo optical path of the invention. When the reference beam 101 is incident onto the holographic recording medium 900 via the first light guidance portion 200 along the first direction, the servo beam 410 is also incident onto the holographic recording medium 900 along the first direction via the servo beam guidance portion 420. Wherein, the servo beam 410 includes the reference beam 101. Therefore, when the servo beam 410 and the reference beam 101 both pass and are converged through the object lens 230, the light spot formed by the converged servo beam 410 is larger than the light spot as formed by the converged reference beam 101, and that the light spot of the servo beam 410 includes the light spot of the reference beam 101. In this embodiment, as shown in FIGS. 2A to 2C, the reference beam 101 and the servo beam 410 can be coaxial beams, that are incident onto object lens 230 and are converged and focused on its optical axis, thus forming coaxial light beams, and are realized as the concentric light spots on the holographic recording medium 900.

Furthermore, the light spot of the reference beam 101 is converged on the even area 9341 of the groove of the holographic recording medium, thus it will not be affected by the servo track 934 to cause scattering. However, the light spot of servo beam 410 may irradiate on the areas outside the even area 9341 of the groove, and it may even irradiate on the groove edge 9342 having a specific shape. As such, it may be modulated by the servo track 934, and thus enabling the holographic interference fringe 800 be recorded onto the holographic recording medium 900 sequentially along a servo track 934.

However, in this embodiment, the groove having wobbling edges is taken as an example of the servo track 934, as shown in FIG. 2C. The grooves having specific edge shape are formed in a second substrate 930 of the holographic recording medium 900. The groove is provided with an even area 9341 and two side groove edges 9342. Wherein, the groove edge 9342 is of a shape, for example, a wobbling shape of a groove edge or a pre-pit shape of groove edge, thus forming the servo track 934 of the holographic recording medium 900, and wherein includes the signal for modulating the servo beam 410. As to the method of encoding or modulating the servo beam 410 by making use of the above-mentioned servo track 934, usually, the coding is realized as based on the variations and combinations of the various edge shapes by making use of the wobbling shape groove edge or pre-pit shape groove edge that can be irradiated by the servo beam 410. As such, the signals of various frequencies can be obtained such as high and low frequencies, thus enabling the modulation of the servo beam 410 and achieving the speedy track search in cooperation of the recording position of the holographic interference fringe 800.

In this embodiment, the SLM 500 utilized is a transmissive type spatial light modulator, such as a transmissive type liquid crystal panel.

Figure 3:
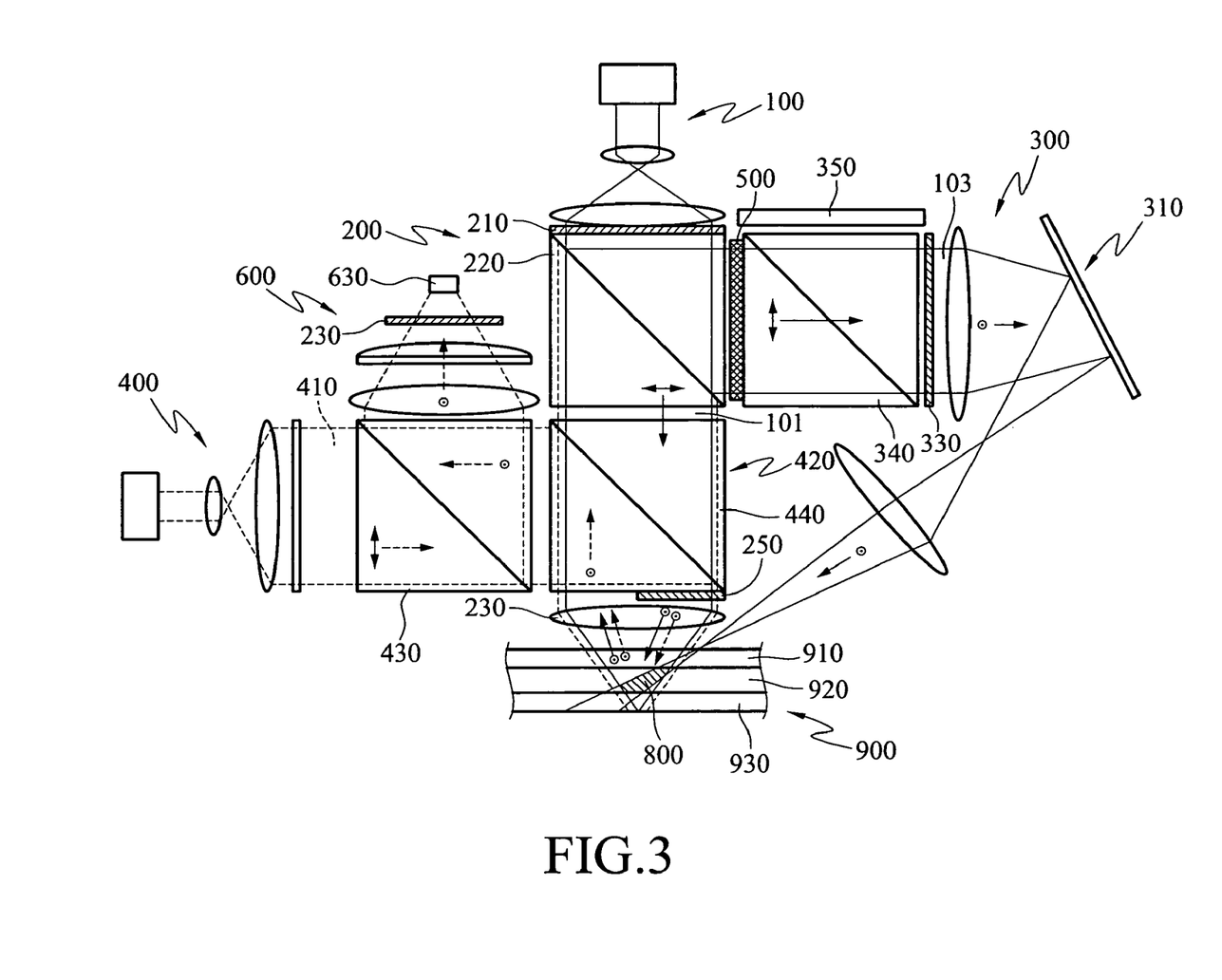
FIG. 3 is a schematic diagram of a holographic recording and reproduction system having servo optical path according to a second embodiment of the invention.

Subsequently, refer to FIG. 3 for a schematic diagram of a holographic recording and reproduction system having servo optical path according to a second embodiment of the invention. The structure of the second embodiment is similar to that of the first embodiment, thus it will not be repeated here for brevity. However, the major difference between the second embodiment and the first embodiment is lying in that, in the second embodiment, a second polarized beam splitter 430 of a servo beam guidance portion 420 is not placed between the beam splitter 220 and the first phase delay sheet 250 as it does in the first embodiment. Instead, a first Dichroic Prism 440 is disposed between the beam splitter 220 and the first phase delay sheet 250, and a second polarized beam splitter 430 is placed on one side of the first Dichroic Prism 440.

Therefore, in the second embodiment of the invention, when a servo beam 410 is generated by a servo light source 400, it is first incident into a second polarized beam splitter 430 and is polarized by the second polarized beam splitter 430 to form a servo beam 410 of P polarization, and then it is incident upon a first Dichroic Prism 440, is reflected by it, and then changes the direction of the servo beam. Similarly, a part of the servo beam 410 will pass through the first phase delay sheet 250 and changes its polarization into S polarization, and is referred to as the right servo beam 410; while the part of servo beam 410 not passing the first phase delay sheet 250 will keep its P polarization, and is referred to as the left servo beam 410. Then, when the right servo beam 410 is incident upon the servo track 934 of the holographic recording medium 900, the right servo beam 410 is reflected by the servo track 934 and exits the holographic recording medium 900, and then it is incident upon a first Dichroic Prism 440, is reflected by it and changes direction and incidents again onto the second polarized beam splitter 430. In addition, the right servo beam 410 changes its polarization into S polarization. Thus, the right servo beam 410 will be reflected by the second polarized beam splitter 430, changes its direction and is incident onto the servo beam sensor 630 of a sensor portion 600. On the other hand, the left servo beam 410 not passing through the first phase delay sheet 250 is incident onto the servo track 934 of the holographic recording medium 900, and it will be reflected by the servo track 934 and exits the holographic recording medium 900. After passing through the first phase delay sheet 250, the left servo beam 410 changes its polarization to S polarization. Subsequently, the left servo beam 410 is incident upon a first Dichroic Prism 440 and is reflected by it and changes direction to be incident upon the second polarized beam splitter 430, and then the left servo beam 410 is reflected and changes its direction, and is incident upon the servo beam sensor 630 of a sensor portion 600. As such, the servo optical path of the embodiment is similar to that of the first embodiment in that, the servo beam 410 to be detected can be induced into the servo beam detector 630, and the servo beam 410 modulated by the servo track 934 can be converted into an electric signal and is transmitted to a control device (not shown). This control device is used to move an optical framework or the holographic recording medium 900, so that the holographic interference fringe 800 can be read from and/or recorded into a recording layer 920 of the holographic recording medium 900 sequentially along a servo track 960.

Figure 4:
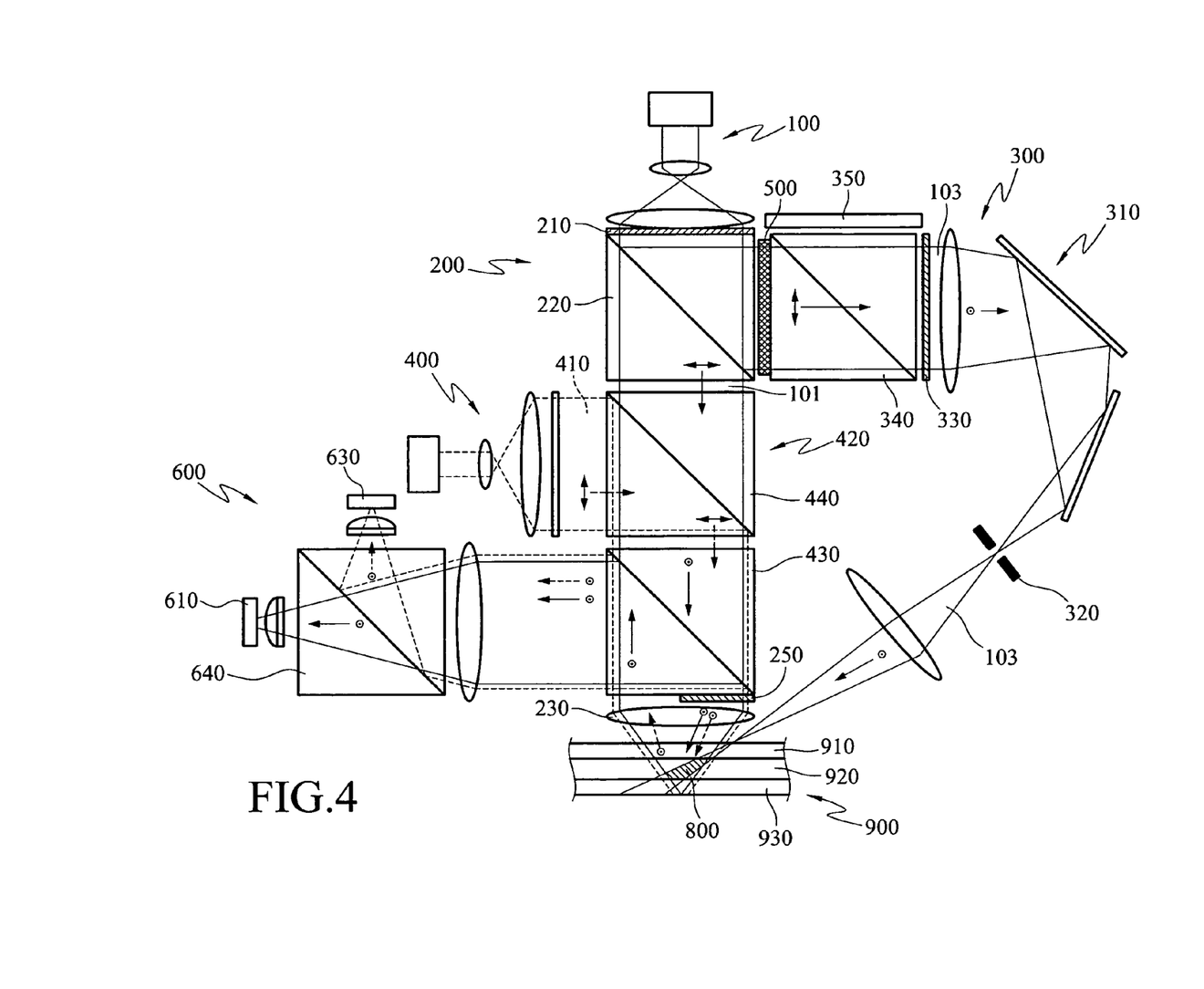
FIG. 4 is a schematic diagram of a holographic recording and reproduction system having servo optical path according to a third embodiment of the invention.

Moreover, refer to FIG. 4 for a schematic diagram of a holographic recording and reproduction system having servo optical path according to a third embodiment of the invention. The framework of this embodiment is similar to that of the first embodiment, thus it will not be repeated here for brevity. However, the major difference between this embodiment and the first embodiment is lying in that, in this second embodiment, the wavelength filter 620 is not disposed in the sensor portion 600 as it does in the first embodiment. Instead, a second Dichroic Prism 640 is provided. As such, when the reference beam 101 is incident upon the holographic recording medium 900, the left reference beam 101 not passing through the first phase delay sheet 250 is reflected by a reflection layer 936 of the holographic recording medium 900, and then it is incident upon the first phase delay sheet 250, hereby changing its polarization to S polarization, thus the left reference beam 101 is incident on a second polarized beam splitter 430 and is reflected and changes its direction, and then is incident on the second Dichroic Prism 640 of the sensor portion 600. As such, the reference beam 101 is unaffected by the second Dichroic Prism 640, and may be incident directly onto a reference beam sensor 610. Then, the left reference beam 101 is then converted into an electric signal and is transmitted to another control device (not shown). On the other hand, the right reference beam 101 passing through the first phase delay sheet 250 is incident on and is reflected by a reflection layer 936 of the holographic recording medium 900, and it may also be incident directly onto the second polarized beam splitter 430. Since the right reference beam 101 changes its polarization to S polarization after passing through the first phase delay sheet 250, thus it may also reflected by the second polarized beam splitter 430, and then changes its direction and is incident onto the second Dichroic Prism 640 of a sensor portion 600, thus being able to incident directly onto the reference beam sensor 610. Therefore, both the left reference beam and the right reference beam 101 may be reflected via the second polarized beam splitter 430, be incident onto the reference beam sensor 610 of the sensor portion 600, and then transmitted to a control device, so that when the reference beam 101 is on, the control device is able to conduct analyses based on the signal received, and make more accurate adjustment of the relative positions and inclination angles of the holographic recording and reproduction system and the holographic recording medium 900.

In the above-mentioned embodiments, the holographic recording and reproduction system having servo optical path can be realized in cooperation with various multiplex mechanisms, such as angle multiplexing, and peristrophic multiplexing, hereby raising the storage capacity of the invention.

In addition, the system of the invention may be realized not only in the reflective type holographic recording medium, but also in transmissive type holographic recording medium, and the details of which are given as follows.

Figure 5A:
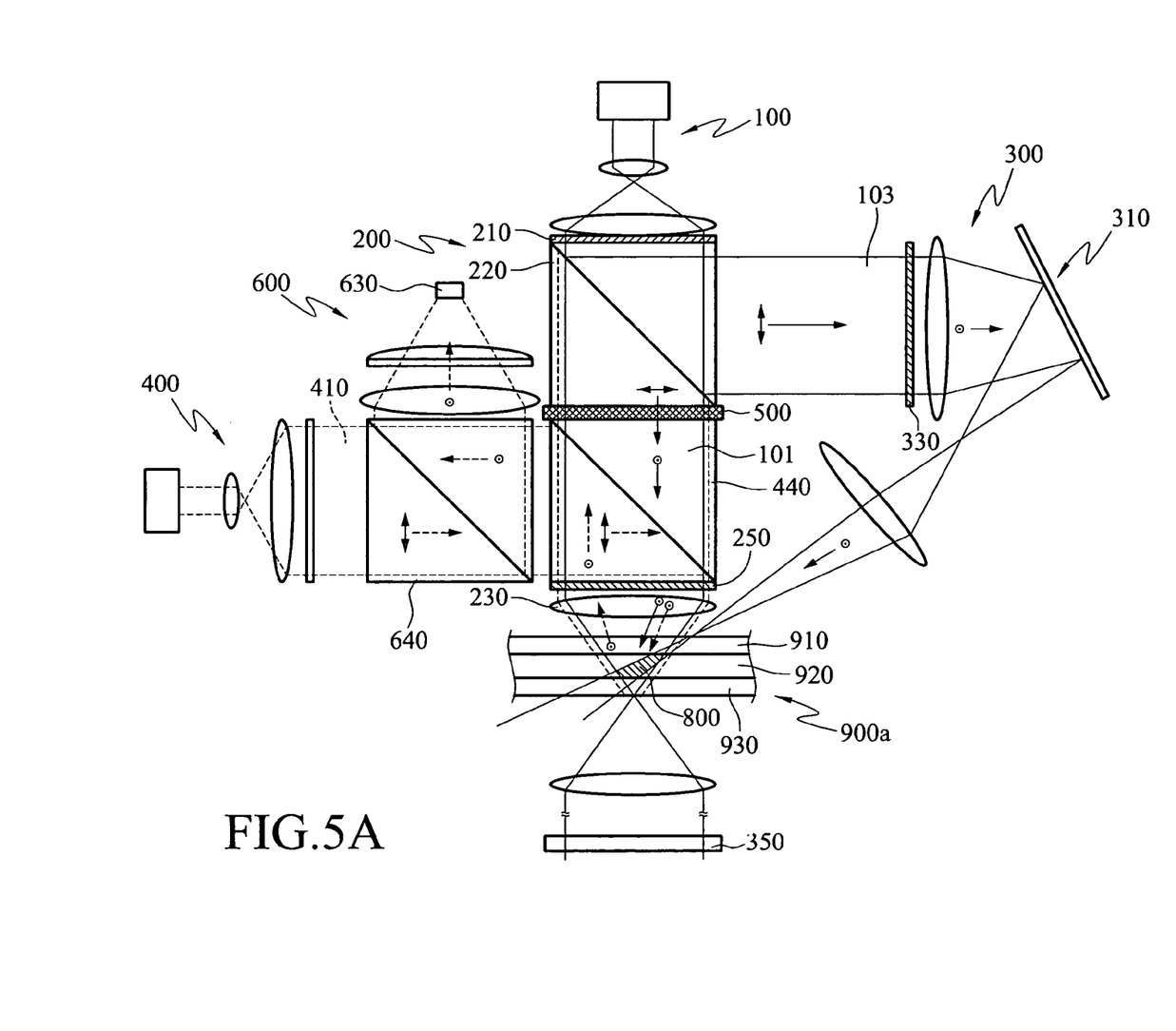
FIG. 5A is a schematic diagram of a holographic recording and reproduction system having servo optical path according to a fourth embodiment of the invention.
Figure 5B:
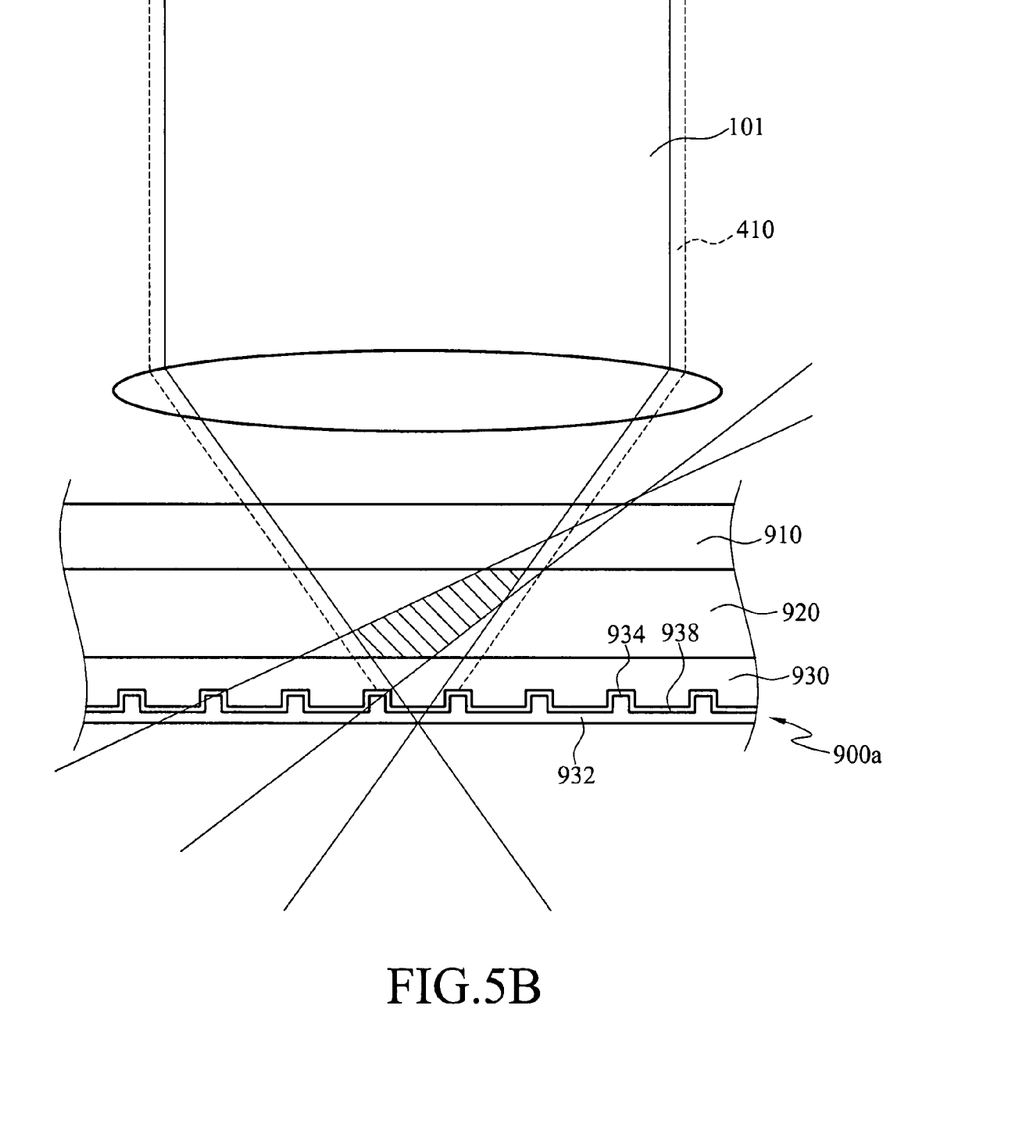
FIG. 5B is a schematic diagram of a holographic recording medium utilized in a holographic recording and reproduction system having servo optical path according to the fourth embodiment of the invention.

Refer to FIGS. 5A and 5B for a schematic diagram of a holographic recording and reproduction system having servo optical path and a schematic diagram of holographic recording medium respectively according to a fourth embodiment of the invention. As shown in FIGS. 5A and 5B, in the implementation of data storage of the holographic recording and reproduction system of this embodiment, a signal beam 103 and a reference beam 101 are incident onto a transmissive type holographic recording medium 900a in a first direction and a second direction respectively, as such the signal beam 103 and the reference beam 101 interfere with each other in a recording layer 920, hereby producing a holographic interference fringe 800, and then record it in the recording layer 920. When the data reproduction is proceed, only the reference beam 101 is used to be incident onto the position of the holographic interference fringe 800, then the reproduction beam will pass through the recording layer 920 and a lens located below the transmissive type holographic recording medium 900a along the first direction, and then is incident on a 2-dimensional image sensor 350 placed below the lens.

In this embodiment, the transmissive type holographic recording medium 900a includes a first substrate 910, a second substrate 930, and a recording layer 920. Wherein, the second substrate 930 is provided with a wavelength selection film 938, in addition to a servo track 934 and a protection layer 932. Similarly, the reference beam 101 and the signal beam 103 may be interference with each other, produce and record a holographic interference fringe 800 in the recording layer 920.

In the above description, a wavelength selection film 938 is placed on a groove and a servo track 934. This wavelength selection film 938 is used to selectively transmit a light beam of a specific wavelength range, and light beams of other wavelength ranges are all reflected. Therefore, in this embodiment, when the reference beam is incident on the transmissive type holographic recording medium 900a, it is able to transmit through the wavelength selection film 938 and the transmissive type holographic recording medium 900a. However, the servo beam 410 will be reflected by the wavelength selection film 938 and exit the transmissive type holographic recording medium 900a, and then is incident upon the servo beam sensor 630 through the servo beam guidance portion 420, as mentioned in the second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A holographic recording and reproduction system having servo optical path, comprising:
   a holographic recording medium;
   a light source, used to generate a light;
   a first light guidance portion, placed in front of said light source, such that said light generated by said light source is divided into a signal beam and a reference beam after passing through said first light guidance portion, wherein the first light guidance portion includes an object lens, said objected lens is used to converge said reference beam into a condensed light beam and said condensed light is incident upon said holographic recording medium along a first direction;
   a spatial light modulator, located on the optical path of said signal beam, thus said signal beam is incident upon said holographic recording medium along a second direction, after it enters and exits said spatial light modulator, hereby interfering with said reference beam in producing a holographic interference fringe in said holographic recording medium;
   a second light guidance portion, used to make said signal beam be incident upon said holographic recording medium along said second direction, after guiding said signal beam into said spatial light modulator, wherein said second light guidance includes more than one lens and more than one set of reflector mirrors, said more than one set of reflector mirrors are used to make said signal beam change its transmission direction after being incident on and exiting said spatial light modulator, one of said more than one lens is used to converge said signal beam into a concentrated light beam and said concentrated light is incident upon said holographic recording medium along said second direction;
   wherein, when said reference beam is incident upon said holographic interference fringe again along said first direction, a reproduction beam is produced, and said reproduction beam is incident upon an image sensor along said optical path of said signal beam in an opposite direction;
   a servo light source, used to generate a servo beam; and
   a servo beam guidance portion, wherein said servo beam is incident upon a servo track of said holographic recording medium via said servo beam guidance portion in said first direction, and reflects said servo beam from said servo track, thus enabling said holographic interference fringe to be recorded in said holographic recording medium continuously along said servo track, the beam formed by said servo beam includes said reference beam.

2. The holographic recording and reproduction system having servo optical path as claimed in claim 1, wherein said servo beam and said reference beam are utilized to form a coaxial light beam.

3. The holographic recording and reproduction system having servo optical path as claimed in claim 1, wherein said first light guidance portion includes:
   a first polarizing plate, placed in front of said light source, so that said light coming from said light source is converted into a linearly polarized light after passing through said first polarizing plate; and
   a beam splitter, used to receive said linearly polarized light and split into said signal beam and said reference beam, and said reference beam is incident on said holographic recording medium along said first direction.

4. The holographic recording and reproduction system having servo optical path as claimed in claim 1, wherein said second light guidance portion further includes a pin hole, placed between said lens and said set of reflector mirrors, and is used to filter out the miscellaneous light beams other than said signal beam and said reproduction beam.

5. The holographic recording and reproduction system having servo optical path as claimed in claim 1, wherein said first light guidance portion further includes:
   a first phase delay sheet, disposed on one side of said beam splitter, thus enabling the portion of said reference beam incident upon said first phase delay sheet to change its polarization state; and
   said second light guidance portion further includes:

a second phase delay sheet, disposed in said optical path of said signal beam, thus said signal beam is incident again upon said second phase delay sheet after being incident and exiting said spatial light modulator, hereby changing the polarization state of said signal beam to be the same as that of said reference beam, so that said portion of said reference beam and said signal beam interfere with each other in said holographic recording medium to produce said holographic interference fringe;

a first polarized beam splitter, is used to generate said reproduction light, when said portion of said reference beam not passing through said first phase delay sheet is incident upon said holographic interference fringe, and said reproduction light is incident upon said second phase delay sheet after passing said lenses and said sets of reflector mirrors, thus changing said polarization state of said reproduction light, so that said reproduction light is reflected and changes its direction, when it is incident upon said first polarized beam splitter; and said image sensor is a two dimensional image sensor, placed on one side of said first polarized beam splitter, and is used to receive said reproduction light reflected and changed direction by said first polarized beam splitter.

6. The holographic recording and reproduction system having servo optical path as claimed in claim 5, wherein said first and second phase delay sheets are both half wave (½λ wave) plates.

7. The holographic recording and reproduction system having servo optical path as claimed in claim 6, wherein said servo beam guidance portion includes:

a second polarized beam splitter, placed between said beam splitter and said first phase delay sheet, so that the portion of said reference beam not passing through said first phase delay sheet is reflected by said holographic recording medium and incident on said first phase delay sheet, thus changing its polarization state, and said portion of said reference beam is incident upon said second polarized beam splitter, and then reflected and changes its direction to be incident upon a sensor portion; said reference beam passing through said first phase delay sheet and having its polarization state changed is reflected by said holographic recording medium, is incident upon, and is reflected by said second polarized beam splitter, hereby changing its direction and being incident on said sensor portion; and a first Dichroic Prism, disposed between said beam splitter and said second polarized beam splitter, and is used to receive said servo beam generated by said servo light source, and separate light beams of different wavelengths, wherein, said reference beam is incident upon and exits said first Dichroic Prism without being affected, thus said servo beam is incident upon and is reflected by said first Dichroic Prism, and then changes its direction and is incident upon a servo track of said holographic recording medium, said servo beam is reflected by said servo track after being modulated by the same, so that said servo beam is incident upon and then exits said first phase delay sheet and changes its polarization state, subsequently, said servo beam is incident upon and is reflected by said second polarized beam splitter, and then changes its direction and is incident upon said sensor portion, as such, said servo beam is converted into an electric signal and is transmitted to a control device, and that is used to adjust said reference beam to be incident upon said holographic recording medium along said first direction, so that said holographic interference fringe is recorded onto said holographic recording medium sequentially along said servo track.

8. The holographic recording and reproduction system having servo optical path as claimed in claim 6, wherein said servo beam guidance portion includes:

a first Dichroic Prism, disposed on one side of said beam splitter and relative to said first polarizing plate, and is used to receive said servo beam generated by said servo light source, and separate the light beams of different wavelengths, wherein, said reference beam is incident upon and exits said first Dichroic Prism without being affected, thus said servo beam is incident upon and is reflected by said first Dichroic Prism, and then changes its direction and is incident upon said servo track of said holographic recording medium, said servo beam is reflected by said servo track after being modulated by the same, so that said servo beam is incident upon and then exits said first phase delay sheet and changes its polarization state, subsequently, said servo beam is incident upon and is reflected by said first Dichroic Prism, thus changing the direction of said servo beam; and a second polarized beam splitter, placed between said first Dichroic Prism and said servo light source, and is used to receive said servo beam reflected by said holographic recording medium, so that when said servo beam is incident again on and is reflected by said second polarized beam splitter, it changes its direction and is incident on said servo beam detector, hereby converting said reference beam into an electric signal and transmitting it to a control device, thus recording said holographic interference fringe onto said holographic recording medium sequentially along said servo track.

9. The holographic recording and reproduction system having servo optical path as claimed in claim 7, wherein said sensor portion further includes a wavelength filter and a servo beam sensor, so that the light beam of a specific wavelength range is allowed to pass through, said wavelength filter filters out said incident reference beam reflected and changed-direction by said second polarized beam splitter, thus allowing said servo beam to pass through and be incident upon said servo beam sensor.

10. The holographic recording and reproduction system having servo optical path as claimed in claim 7, wherein said sensor portion further includes a second Dichroic Prism, a servo beam sensor, and a reference beam sensor, such that said reference beam being incident upon said second Dichroic Prism passes through directly and is incident on said reference beam sensor, hereby converting said reference beam into an electric signal and transmitting it to a control device, and that is used to analyze and adjust the relative distance and inclination angle of said holographic recording and reproduction system and said holographic recording medium, while said servo beam is incident on and is reflected by said second Dichroic Prism, and then it changes its direction and is incident on said servo beam sensor, hereby converting said reference beam into an electric signal and transmitting it to a control device, thus recording said holographic interference fringe onto said holographic recording medium sequentially along said servo track.

11. The holographic recording and reproduction system having servo optical path as claimed in claim 1, wherein said spatial light modulator is a transmissive type spatial light modulator.

12. The holographic recording and reproduction system having servo optical path as claimed in claim 11, wherein said transmissive type spatial light modulator is a liquid crystal panel.

13. The holographic recording and reproduction system having servo optical path as claimed in claim 1, wherein said holographic recording medium includes:
- a first substrate;
- a second substrate, comprising:
  - a protection layer, formed on the bottom layer of said second substrate;
  - a servo track, formed on said protection layer, and is used for modulating said incident servo beam; and
  - a reflection layer, covered on the surface of said servo track, and is used to reflect said incident reference beam and said incident servo beam; and
- a recording layer, formed between said first substrate and said second substrate, and is used to record said holographic interference fringe produced by the interference of said signal beam and said reference beam.

14. The holographic recording and reproduction system having servo optical path as claimed in claim 13, wherein said servo track is a groove having specific edge shape.

15. The holographic recording and reproduction system having servo optical path as claimed in claim 14, wherein said groove having specific edge shape is a groove having wobbling shape edge.

16. The holographic recording and reproduction system having servo optical path as claimed in claim 14, wherein said groove having specific edge shape is a groove having pre-pit edge.

* * * * *